United States Patent
Stylos et al.

(10) Patent No.: US 11,163,548 B2
(45) Date of Patent: Nov. 2, 2021

(54) CODE REGISTRATION TO DETECT BREAKING API CHANGES

(71) Applicant: International Business Machines Corporation, Armonk, NY (US)

(72) Inventors: Jeffrey Stylos, Somerville, MA (US); Ajiemar D. Santiago, Volente, TX (US); Dustin Popp, Austin, TX (US); German Attanasio Ruiz, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 16/733,027

(22) Filed: Jan. 2, 2020

(65) Prior Publication Data

US 2021/0208865 A1 Jul. 8, 2021

(51) Int. Cl.
*G06F 8/65* (2018.01)
*G06F 11/32* (2006.01)
*G06F 9/54* (2006.01)

(52) U.S. Cl.
CPC .............. *G06F 8/65* (2013.01); *G06F 9/54* (2013.01); *G06F 11/327* (2013.01)

(58) Field of Classification Search
None
See application file for complete search history.

(56) References Cited

U.S. PATENT DOCUMENTS

| | | | |
|---|---|---|---|
| 9,396,091 B2 | 7/2016 | Bally | |
| 10,114,637 B1 * | 10/2018 | Willson | G06F 8/71 |
| 10,579,966 B1 * | 3/2020 | Willson | G06F 8/30 |
| 10,671,510 B1 * | 6/2020 | Willson | G06F 11/3604 |
| 10,817,483 B1 * | 10/2020 | Samdani | G06F 16/3329 |
| 2002/0144018 A1 * | 10/2002 | Knutson | G06F 8/76 719/328 |
| 2014/0366011 A1 * | 12/2014 | Rector | G06F 8/71 717/170 |
| 2018/0107479 A1 * | 4/2018 | Duppenthaler | G06F 8/71 |
| 2018/0314622 A1 | 11/2018 | Lowe | |
| 2019/0384650 A1 * | 12/2019 | Danielsson | G06F 8/75 |
| 2020/0326913 A1 * | 10/2020 | Ying | G06F 8/10 |

OTHER PUBLICATIONS

Robbes et al., "How Do Developers React to API Deprecation? The Case of a Smalltalk Ecosystem," Nov. 2012, ACM. (Year: 2012).*
"A Method and System for Customizing and Prioritizing Web Service Release Notes," IBM, IP.com, IPCOM000159085D, Oct. 8, 2007, 8 pages.
"Method and System for Autonomic Creation and Notification of Dynamic Interest Group of Software Developers," IBM, IP.com, IPCOM000176115D, Nov. 6, 2008, 5 pages.

* cited by examiner

*Primary Examiner* — Qing Chen
(74) *Attorney, Agent, or Firm* — VanLeeuwen & VanLeeuwen; Alexander G. Jochym

(57) ABSTRACT

An approach is provided in which the approach registers a code snippet received from a user that corresponds to source code executing on a client. The approach evaluates the registered code snippet and identifies an application program interface (API) feature that calls an API from the code snippet. When the approach determines that the API feature is deprecated by the API, the approach generates a custom notification that includes the deprecated API feature and sends the custom notification to the client.

17 Claims, 7 Drawing Sheets

600 ⤶

Register Code Snippet

Past code snippet in supported language to be notified of potentially breaking changes in service behavior:

Email: [ user@company.com ] ← 610

620

```
var Discovery V1 = require ('developer-cloud/discovery/V1');

var discovery = new DiscoveryV1({
   version: '2018-10-15',
   iam_apikey: '{apikey}',
   url: "{url}"
});

discovery.createEnvironment({
   name: 'my_environment',
   description: 'My environment',
   size:'LT'
},
   function (err, response) {
      if (err)
         console.log('error:', err);
      else
         console.log("Created environment of size " + response.size /1024 + "kb");
});
```
← 375

630    640

[ Register Code Snippet ] ← 650

Dear Mr. Smith,

This is an automated email to let you know that a code snippet you registered with our system has been detected to be affected by an upcoming Discovery service change. If you make no changes, this code will throw a null pointer exception starting July 1, 2019 when the <u>environment.size</u> field is removed from the API. ← 710

According to our logs, your code is still being used and was called <u>152 times</u> this past month. ← 720
← 725

― 730
```
function (err, response) {
    if (err)
        console.log('error:', err);
    else
        console.log("Created environment of size" + response.size);
});
```
← 640

Below is a suggestion for how to change your code: ― 750
```
function (err, response) {
    if (err)
        console.log('error:', err);
    else
        console.log("Created environment of size" + response.capacity);
});
```
← 760

*FIG. 7*

CODE REGISTRATION TO DETECT BREAKING API CHANGES

BACKGROUND

An application programming interface (API) is a software intermediary that allows two software applications to communicate. In building applications, an API simplifies programming by abstracting the underlying implementation and exposing objects or actions a developer requires. Web APIs are defined interfaces through which an enterprise application and client applications interact.

When used in the context of web development, a web API is typically defined as a set of specifications, such as Hypertext Transfer Protocol (HTTP) request messages, along with a definition of the structure of response messages. The API specification provides a broad understanding of how an API behaves and how the API links with other APIs. The API definition is aimed at machine consumption and provides information about how the API functions, how it links with other APIs, and results to expect from the API in a machine-readable format.

BRIEF SUMMARY

According to one embodiment of the present disclosure, an approach is provided in which the approach registers a code snippet received from a user that corresponds to source code executing on a client. The approach evaluates the registered code snippet and identifies an application program interface (API) feature that calls an API from the code snippet. When the approach determines that the API feature is deprecated by the API, the approach generates a custom notification that includes the deprecated API feature and sends the custom notification to the client.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary diagram showing a user interface for registering code snippets with an API feature manager; and FIG. 7 is an exemplary diagram depicting a custom notification generated for a client.

DETAILED DESCRIPTION

Figure 1:
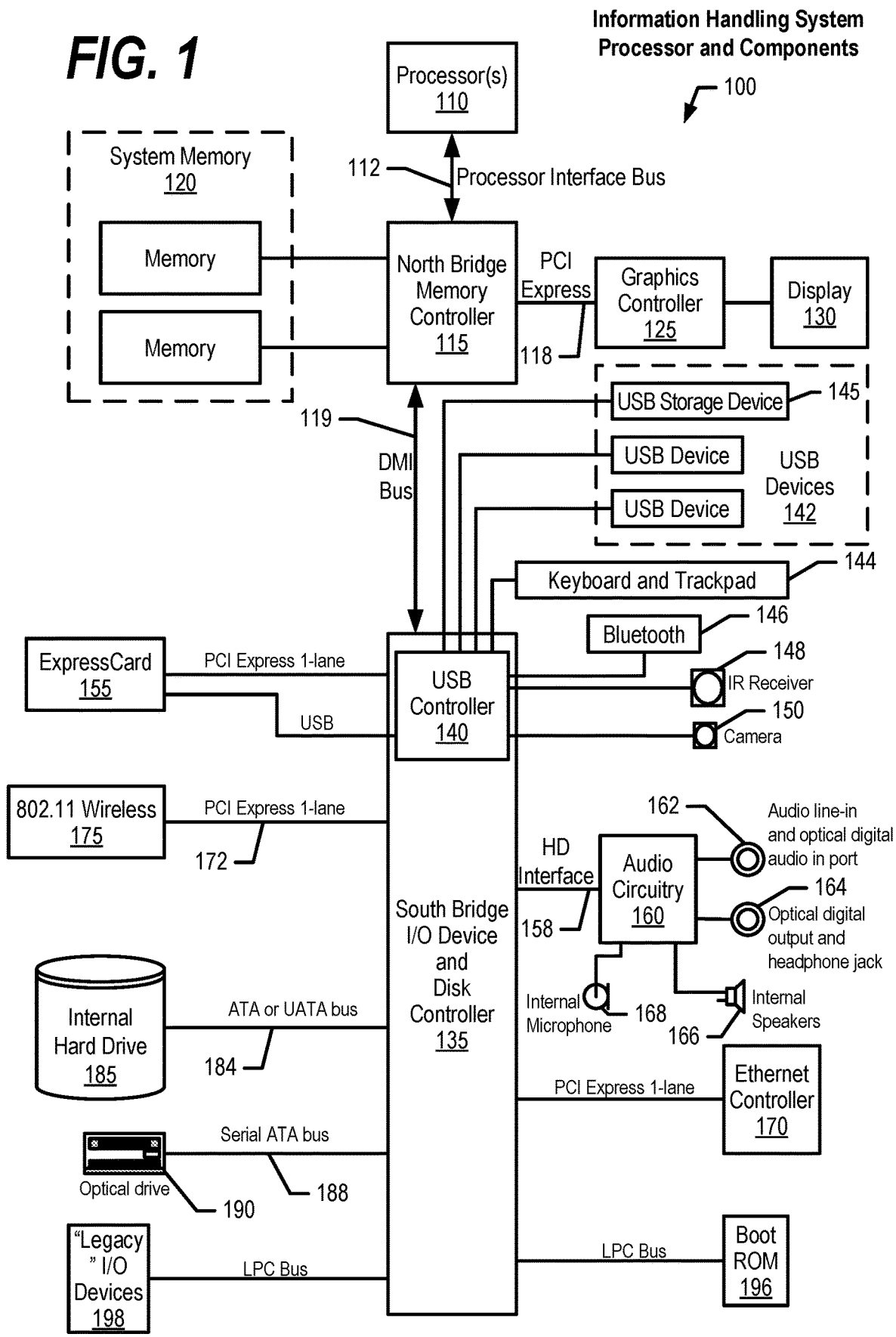
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects lowbandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
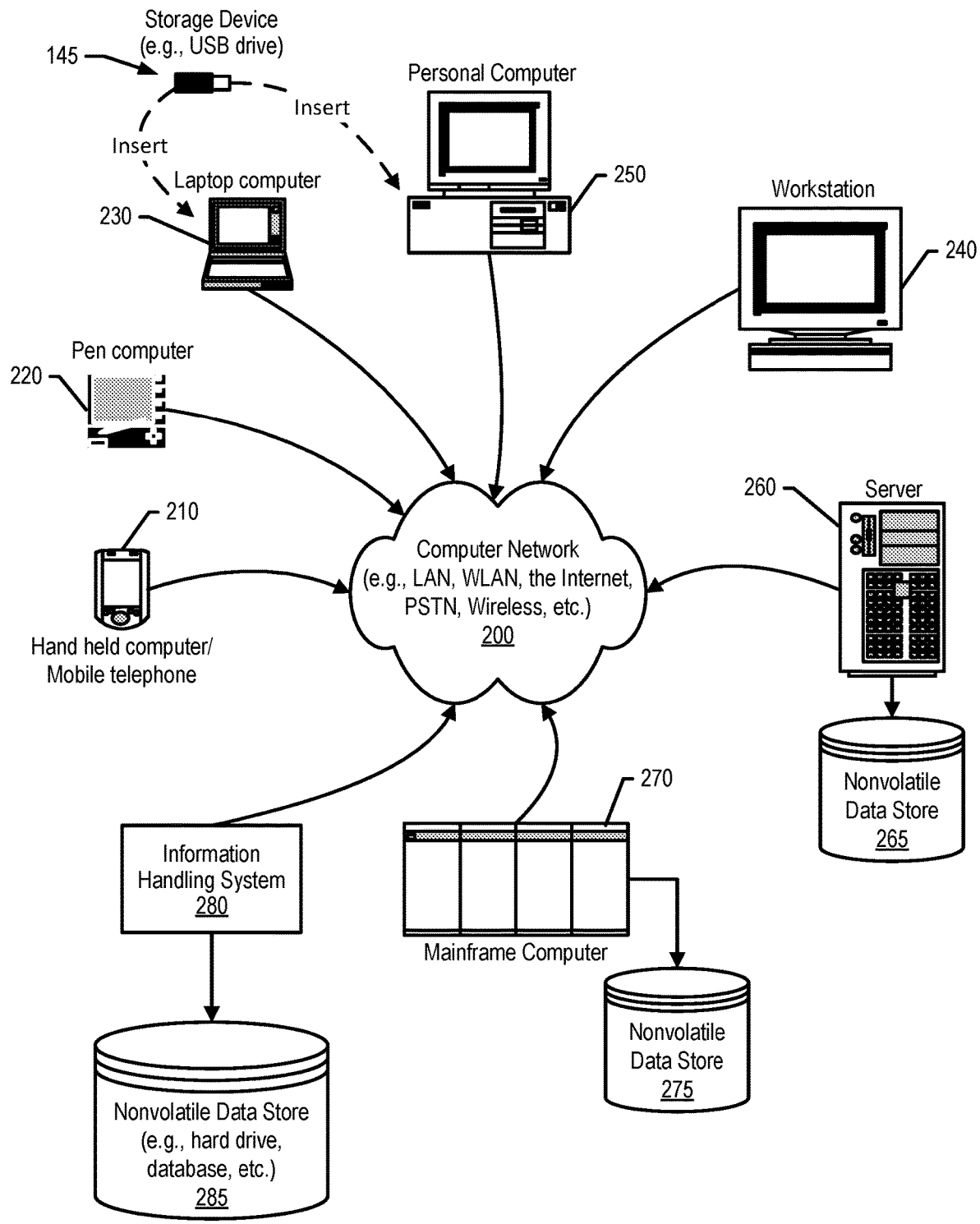
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, an API is a software intermediary that allows two software applications to communicate. At times, web API developers wish to make changes to an API to remove outdated API features. Before removing an API feature, the web API developers typically "deprecate" the API feature, which means that the API feature is still available but will be removed at some time in the future. A challenge found with existing approaches is that the web API developers have trouble determining which users, and how many users, will be affected by an API feature change. As a result, the web API developers are hesitant to make potentially breaking API changes and, when the web API developers do remove API features, many users are typically caught off guard by the changes. These issues present several problems, such as (i) making web support more complicated and expensive; (ii) making the documentation more verbose, and (iii) preventing services from adopting new, more generally beneficial API feature behavior.

FIGS. 3 through 7 depict an approach that can be executed on an information handling system that identifies users using API features that are deprecated by API developers, and sends a customized notification to the identified users that include suggested changes to the users' source code. The approach analyzes a code snippet previously registered by a user and logs API features included in the code snippets. Then, the approach tracks an amount of API calls from the code snippet during runtime execution and, in one embodiment, determines whether to deprecate the API feature based on the amount of API calls. The approach then sends a custom notification to the user that includes a suggested set of replacement code for replacing the deprecated API feature with an active API feature.

Figure 3:
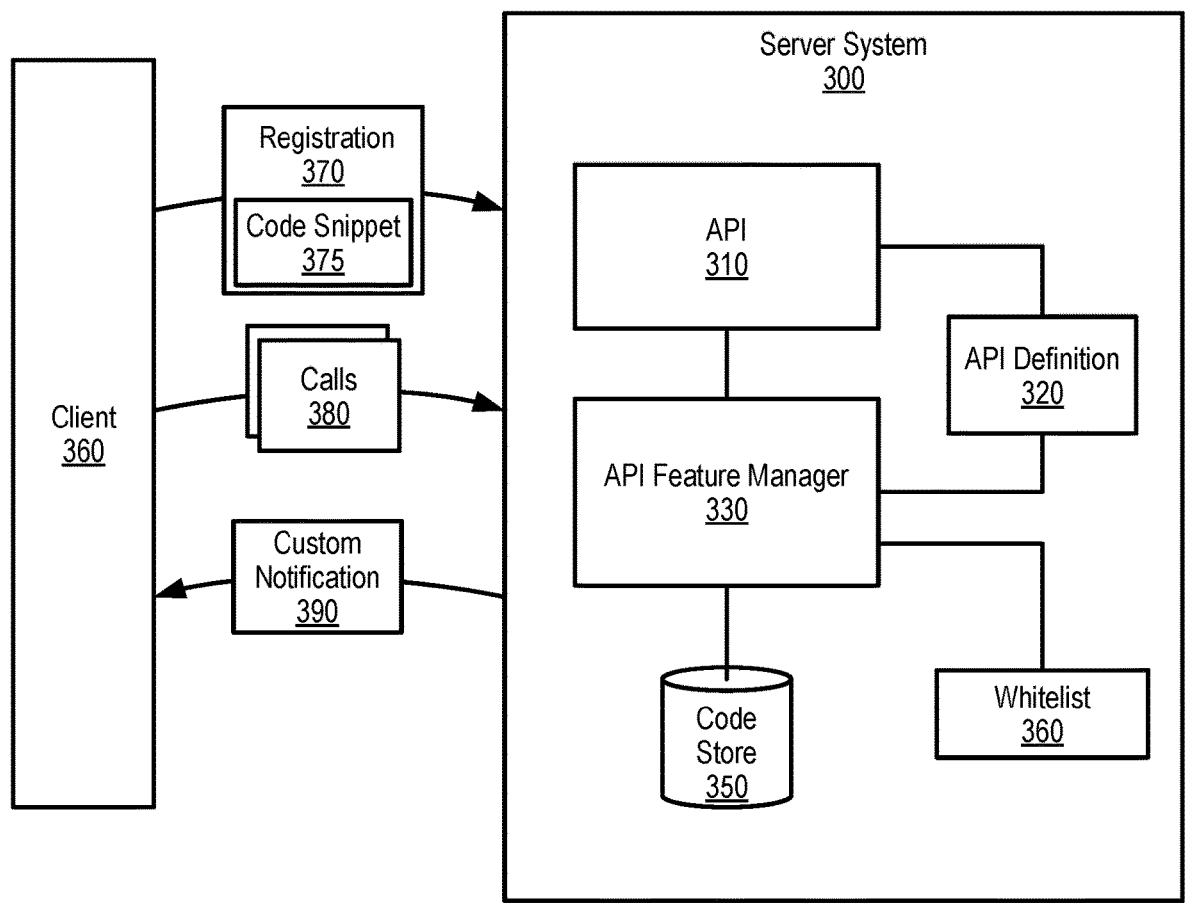
FIG. 3 is an exemplary diagram depicting an API feature manager that generates a custom notification based on deprecated API features and sends the custom notification to a user whose source code utilizes the deprecated API features.

FIG. 3 is an exemplary diagram depicting API feature manager 330 that generates a custom notification 390 based on deprecated API features and sends custom notification 390 to a user whose source code utilizes the deprecated API features.

Server system 300 includes API 310 that adheres to API definition 320. API definition 320 includes specifications for routines, data structures, object classes, variables, remote calls, etc. At times, an API administrator changes API definition 320 to deprecate API features will be removed in the near future. API feature manager 330 performs steps as discussed herein to (i) identify changes in API definition 320 pertaining to deprecated API features; (ii) identify those clients/users that are effected by the deprecated API features; and (iii) send custom notifications 390 to the effected clients/users without inundating other clients/users with notifications that are not affected by the deprecated API features.

A user sends registration 370 to server system 300 through a user interface, such as user interface 600 shown in FIG. 6. Registration 370 includes the user's email address and a snippet of code from the user's source code (code snippet 375). The user includes as much or as little of the source code into code snippet 375 as the user prefers. API feature manager 330 assigns a unique ID to code snippet 375 and stores the user's email, code snippet 375, and the unique ID in code store 350. In one embodiment, API feature manager 330 sends the unique ID to client 360 and client 360 modifies its source code to send the unique ID during subsequent calls 380 discussed below.

During runtime, API feature manager 330 tracks the amount of times that client 360 invokes code snippet 375 via calls 380. API feature manager 330 stores the frequency of calls in code store 350 based on, in one embodiment, the unique ID corresponding to code snippet 375. When API feature manager 330 detects a change in API definition 320, API feature manager 330 uses the information stored in code store 350 to match the API feature changes in API definition 320 to various code snippets and their associated users. As such, API feature manager 330 sends custom notification 390 directly to the effected user to inform the effected user of the API change and provides a suggested approach to replace the deprecated API features with active API features (see FIG. 7 and corresponding text for further details). In one embodiment, an API administrator evaluates the utilization information in code store 350 to identify underutilized API features for which to deprecate.

In one embodiment, API feature manager 330 parses code snippet 375 into an abstract syntax tree (AST) to determine whether or not deprecated API features are used by code snippet 375. In this embodiment, if the deprecated API features are used by code snippet 375, then depending on the change, API feature manager 330 checks whitelist 360 to determine whether to send custom notification 390 to the user. Whitelist 360 includes usage patterns to check for a deprecated API feature such as "Does the client access the specific output field?"

Figure 4:
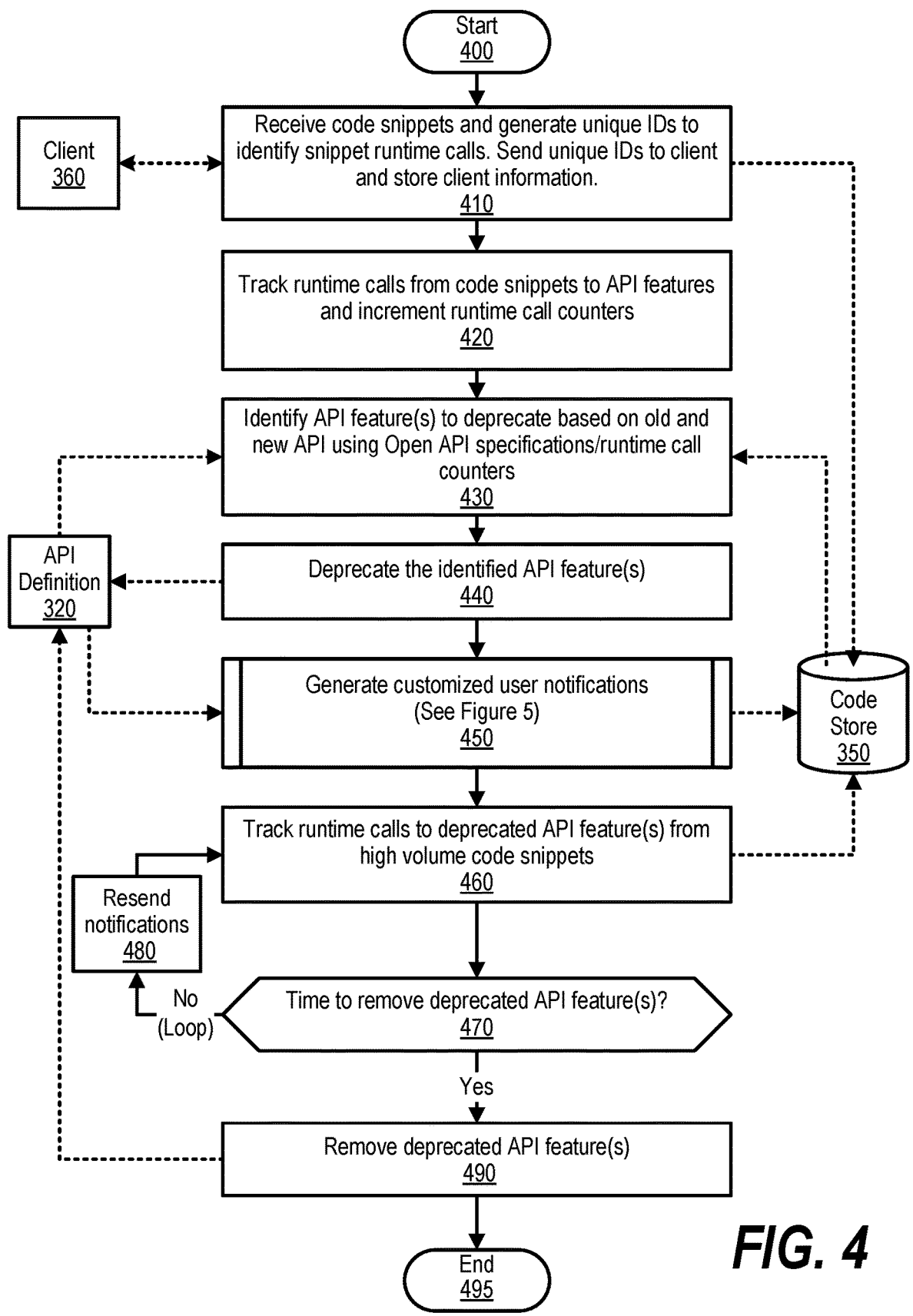
FIG. 4 is an exemplary flowchart showing steps taken to analyze client code and send custom notifications to clients corresponding to deprecated API features.

FIG. 4 is an exemplary flowchart showing steps taken to analyze client code and send custom notifications to clients corresponding to deprecated API features. FIG. 4 processing commences at 400 whereupon, at step 410, the process receives code snippets registrations and generates unique IDs to identify the code snippets during subsequent runtime API calls. The process sends the unique IDs to client 360 and also stores the unique IDs with client information in code store 350.

At step 420, the process tracks runtime calls 380 from clients and increments runtime call counters in code store 350 when API features are called. In one embodiment, when the process receives API calls containing unique IDs, the process uses the unique IDs to differentiate between multiple registered snippets to generate more specific notifications later in the process discussed below.

At step 430, the process identifies API features to deprecate based on (i) comparing an old API definition 320 against a new API definition 320, (ii) the API call utilization information stored in code store 350, or a combination of both. In one embodiment, the process identifies which API features are underutilized based on the runtime call counters and recommends removing the underutilized API features to an API administrator. At step 440, the process deprecates the identified API features in API definition 320.

Figure 5:
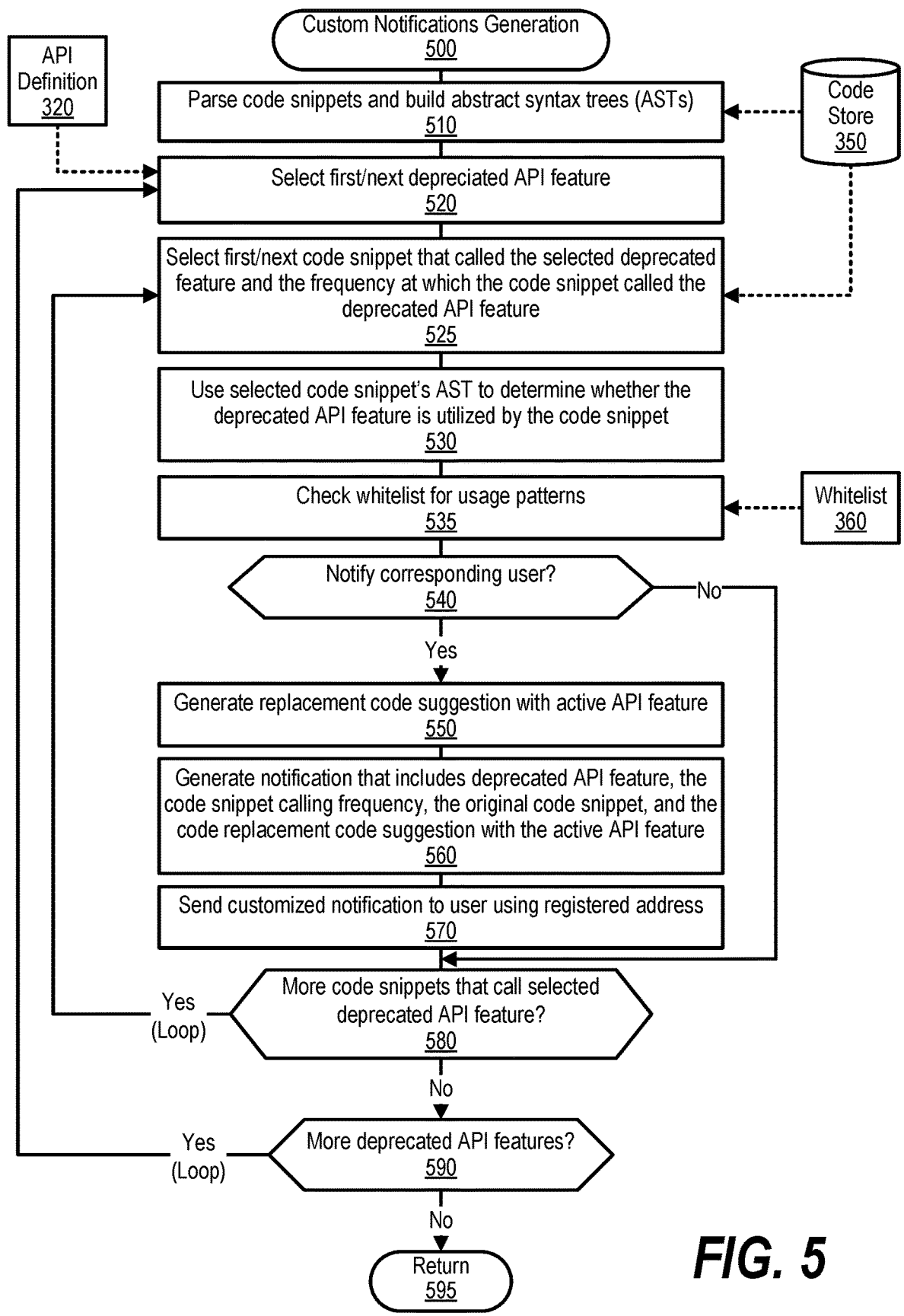
FIG. 5 is an exemplary flowchart showing steps taken to generate custom notifications to users affected by a deprecated API that include suggested changes to their code.

At step 450, the process evaluates various code snippets in code store 350 and generates customized user notifications to users whose registered code snippets utilize the deprecated API features (predefined process block 450, see FIG. 5 and corresponding text for further details). The custom notifications include, in one embodiment, the amount of times that the user's source code called the deprecated API feature along with a suggested replacement code that replaces the deprecated API feature with an active API feature (see FIG. 7 and corresponding text for further details).

At step 460, the process tracks runtime calls to the deprecated API feature(s) from, in one embodiment, high volume code snippets (high volume clients). The process determines as to whether the deprecated API features can be removed from API definition 320 without disrupting the user community, such as after each of the high volume users have modified their code (decision 470).

If, in one embodiment, the high volume users have not stopped calling the API feature, such as by not yet implementing the suggested code in the notification, then decision 470 branches to the 'no' branch which loops back to resend the custom notifications to the applicable users (step 480). This looping continues until the process has determined that it is time to remove the API features (reduced API calls, time limit, etc.), at which point decision 470 branches to the 'yes' branch exiting the loop. At step 490, the process removes the deprecated API feature(s) from API definition 320 and FIG. 4 processing thereafter ends at 495.

FIG. 5 is an exemplary flowchart showing steps taken to generate custom notifications to users affected by a deprecated API that include suggested changes to their code. FIG. 5 processing commences at 500 whereupon, at step 510, the process parses registered code snippets stored in code store 350 and, in one embodiment, the process builds abstract syntax trees (ASTs). The ASTs are tree representations of the abstract syntactic structures of code snippets. Each node of a tree denotes a construct occurring in the code snippet and the syntax is "abstract" in the sense that it does not represent every detail appearing in the real syntax, but rather represents the structural or content-related details of the code snippet. For example, grouping parentheses are implicit in the tree structure and a syntactic construct such as an "if-condition-then" expression may be denoted using a single node with three branches.

At step 520, the process selects the first deprecated API feature from API definition 320. At step 525, the process analyzes the runtime utilization information stored in code store 350 and selects the first code snippet that called the selected deprecated feature and the frequency at which the code snippet called the deprecated API feature (see FIG. 4 and corresponding text for further details).

At step 530, the process uses the selected code snippet's AST to determine whether the code snippet would be affected by the deprecation of the selected API feature. At step 535, the process checks whitelist 360 for usage patterns, such as whether or not a removed output field is accessed by the registered code. The whitelisted patterns capture known code patterns that will be broken by the API change, while API use that does not match the patterns represent a possible affected use. For example, if an API removed a field nested in a response object, a whitelisted pattern checks whether the specific nested field is accessed by the registered code.

The process determines as to whether to notify the user corresponding to the selected code snippet based on the results of steps 530 and 535 (decision 540). If the process should notify the corresponding user, then decision 540 branches to the 'yes' branch whereupon, at step 550, the process generates a replacement code suggestion with an active API feature (see FIG. 7, reference numeral 760, and corresponding text for further details). The replacement code is generated based on a specific change. For example, if an old field is removed but a new field captures the same or similar value, then the new field name is suggested as a replacement.

At step 560, the process generates a custom notification that includes, in one embodiment, the deprecated API feature, the code snippet API call frequency (runtime utilization), the original code snippet, and the replacement code suggestion that includes the active API feature (see FIG. 7 and corresponding text for further details). At step 570, the process uses the registered email address of the corresponding user to send the customized notification to the user. In one embodiment, the process sends the customized notification to client 360 and client 360 automatically replaces, or upon approval by the user, the corresponding source code's deprecated API feature with the active API feature included in the suggested replacement code.

Referring back to decision 540, if the process should not notify the corresponding user, then decision 540 branches to the 'no' branch bypassing steps 550, 560, and 570.

The process determines as to whether there are more code snippets (e.g., from other users) stored in code store 350 that call the selected deprecated API feature (decision 580). If there are more code snippets that call the selected deprecated API feature, then decision 580 branches to the 'yes' branch which loops back to select and process the next code snippet. This looping continues until there are no more code snippets that call the selected deprecated API feature, at which point decision 580 branches to the 'no' branch exiting the loop.

The process determines as to whether there are more deprecated API features in API definition 320 to evaluate (decision 590). If there are more deprecated API features in API definition 320 to evaluate, then decision 590 branches to the 'yes' branch which loops back to select and process the next deprecated API feature. This looping continues until there are no more deprecated API features to process, at which point decision 590 branches to the 'no' branch exiting the loop. FIG. 5 processing thereafter returns to the calling routine (see FIG. 4) at 595.

FIG. 6 is an exemplary diagram showing a user interface to register code snippets with API feature manager 330. User interface 600 allows a user to register code snippet 375 via client 360 with API feature manager 330. The user enters the user's email address or other contact information (e.g., social media information) in box 610 and copies code snippet 375 from the user's source code into box 620. The user may copy as much or as little of the source code into box 620 based on the user's comfort level. This allows the user to ensure that sufficient context is captured to detect breaking API usage while limiting the amount of private code a user has to share.

FIG. 6 shows that the code snippet calls console.log 630 and response.size 640. API feature manager 330 logs the user's email, API call 630, and API call 640 into code store 350 and creates a unique ID that is associated to code snippet 375 (see FIG. 4 and corresponding text for further details). The user then selects button 650 to register code snippet 375.

When an API feature corresponding to console.log 630 or response.size 640 is deprecated, API feature manager 330 generates a custom notification and sends custom notification 390 to the corresponding user through client 360 (see FIG. 7 and corresponding text for further details). As a result, the user receives targeted notifications and is not inundated with notifications each time API definition 320 includes changes that are not relevant to the user's source code.

FIG. 7 is an exemplary diagram depicting a custom notification generated for a client. Server system 300 sends custom notification 390 to a user via client 360. Custom notification 390 includes deprecated API feature 710, a relevant portion of code snippet 375 in window 730 that identifies the location of which the deprecated API feature is called (640), and the amount of times that code snippet 375 called the deprecated API feature over a timeframe (725).

In addition, custom notification 390 includes suggested replacement code in window 750 that replaces deprecated API feature 640 with active API feature 760. In turn, the user is able to copy the suggested replacement code into the user's source code to resolve using deprecated API feature 640 in future API calls.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    registering a code snippet provided by a user, wherein the registered code snippet corresponds to a source code executing on a client;

evaluating the registered code snippet and identifying an application program interface (API) feature in the registered code snippet that calls an API; and in response to determining that the API feature in the registered code snippet is deprecated by the API:

automatically generating a set of replacement code that replaces the deprecated API feature in the registered code snippet with an active API feature;

generating a custom notification that comprises the deprecated API feature in the registered code snippet and the set of replacement code; and sending the custom notification to the user.

2. The method of claim 1 wherein, prior to determining that the API feature in the registered code snippet is deprecated by the API, the method further comprises:

assigning a unique ID to the registered code snippet;

utilizing the unique ID to track an amount of runtime API calls that the API feature in the registered code snippet calls the API; and deprecating the API feature in the registered code snippet in response to determining that the amount of runtime API calls fails to meet a minimum threshold.

3. The method of claim 2 further comprising:

inserting the amount of runtime API calls into the custom notification.

4. The method of claim 2 further comprising:

sending the unique ID to the client, wherein the client modifies the source code to include the unique ID in the runtime API calls.

5. The method of claim 1 further comprising:

in response to receiving the set of replacement code at the client, modifying the source code, by the client, by replacing the deprecated API feature in the registered code snippet with the active API feature.

6. The method of claim 1 wherein, in response to sending the custom notification to the user, the method further comprises:

tracking an amount of runtime API calls that the API feature in the registered code snippet calls the API; and in response to determining that the amount of runtime API calls reaches a threshold:

suppressing a removal of the API feature in the registered code snippet; and resending the custom notification to the user.

7. An information handling system comprising:

one or more processors;

a memory coupled to at least one of the one or more processors; and a set of computer program instructions stored in the memory and executed by the at least one of the one or more processors in order to perform actions of:

registering a code snippet provided by a user, wherein the registered code snippet corresponds to a source code executing on a client;

evaluating the registered code snippet and identifying an application program interface (API) feature in the registered code snippet that calls an API; and in response to determining that the API feature in the registered code snippet is deprecated by the API:

automatically generating a set of replacement code that replaces the deprecated API feature in the registered code snippet with an active API feature;

generating a custom notification that comprises the deprecated API feature in the registered code snippet and the set of replacement code; and sending the custom notification to the user.

8. The information handling system of claim 7 wherein, prior to determining that the API feature in the registered code snippet is deprecated by the API, the at least one of the one or more processors perform additional actions comprising:

assigning a unique ID to the registered code snippet;

utilizing the unique ID to track an amount of runtime API calls that the API feature in the registered code snippet calls the API; and deprecating the API feature in the registered code snippet in response to determining that the amount of runtime API calls fails to meet a minimum threshold.

9. The information handling system of claim 8 wherein the at least one of the one or more processors perform additional actions comprising:

inserting the amount of runtime API calls into the custom notification.

10. The information handling system of claim 8 wherein the at least one of the one or more processors perform additional actions comprising:

sending the unique ID to the client, wherein the client modifies the source code to include the unique ID in the runtime API calls.

11. The information handling system of claim 7 wherein the at least one of the one or more processors perform additional actions comprising:

in response to receiving the set of replacement code at the client, modifying the source code, by the client, by replacing the deprecated API feature in the registered code snippet with the active API feature.

12. The information handling system of claim 7 wherein, in response to sending the custom notification to the user, the at least one of the one or more processors perform additional actions comprising:

tracking an amount of runtime API calls that the API feature in the registered code snippet calls the API; and in response to determining that the amount of runtime API calls reaches a threshold:

suppressing a removal of the API feature in the registered code snippet; and resending the custom notification to the user.

13. A computer program product stored in a computer readable storage medium, comprising computer program code that, when executed by an information handling system, causes the information handling system to perform actions comprising:

registering a code snippet provided by a user, wherein the registered code snippet corresponds to a source code executing on a client;

evaluating the registered code snippet and identifying an application program interface (API) feature in the registered code snippet that calls an API; and in response to determining that the API feature in the registered code snippet is deprecated by the API:

automatically generating a set of replacement code that replaces the deprecated API feature in the registered code snippet with an active API feature;

generating a custom notification that comprises the deprecated API feature in the registered code snippet and the set of replacement code; and sending the custom notification to the user.

14. The computer program product of claim 13 wherein, prior to determining that the API feature in the registered code snippet is deprecated by the API, the information handling system performs further actions comprising:

assigning a unique ID to the registered code snippet;

utilizing the unique ID to track an amount of runtime API calls that the API feature in the registered code snippet calls the API; and deprecating the API feature in the registered code snippet in response to determining that the amount of runtime API calls fails to meet a minimum threshold.

15. The computer program product of claim 14 wherein the information handling system performs further actions comprising:

sending the unique ID to the client, wherein the client modifies the source code to include the unique ID in the runtime API calls; and inserting the amount of runtime API calls into the custom notification.

16. The computer program product of claim 13 wherein the information handling system performs further actions comprising:

in response to receiving the set of replacement code at the client, modifying the source code, by the client, by replacing the deprecated API feature in the registered code snippet with the active API feature.

17. The computer program product of claim 13 wherein, in response to sending the custom notification to the user, the information handling system performs further actions comprising:

tracking an amount of runtime API calls that the API feature in the registered code snippet calls the API; and in response to determining that the amount of runtime API calls reaches a threshold:

suppressing a removal of the API feature in the registered code snippet; and resending the custom notification to the user.

* * * * *